United States Patent Office 2,931,825
Patented Apr. 5, 1960

2,931,825

DITHIOPHOSPHORIC ACID ESTERS

Karl Lutz, Basel, Switzerland, assignor to Sandoz Ltd., Basel, Switzerland

No Drawing. Application December 2, 1957
Serial No. 699,898

Claims priority, application Switzerland
December 12, 1956

1 Claim. (Cl. 260—461)

The present invention relates to dithiophosphoric acid esters of the formula

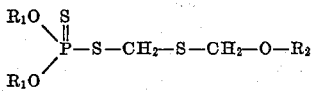

Such a dithiophosphoric acid ester can conveniently be prepared by the reaction between the corresponding compounds of the formula

and of the formula $$R_2-O-CH_2-S-CH_2-O-R_2 \quad (II)$$

Alcohol of the formula $R_2OH$ splits off in the course of the reaction. In the foregoing, each of $R_1$ and $R_2$ is a lower alkyl group.

Representative compounds of Formula I which are useful in the preparation of the new esters of the present invention are e.g. dimethyldithiophosphoric acid, diethyldithiophosphoric acid, di-n-propyldithiophosphoric acid, diisopropyldithiophosphoric acid, dibutyldithiophosphoric acid, etc. Representative compounds of Formula II are e.g. the compounds of the following formulae:

The reaction is, for example carried out as follows:
The compounds of Formulae I and II, in simple admixture or in a solvent medium, are heated until completion of the splitting off of alcohol according to the following reaction scheme:

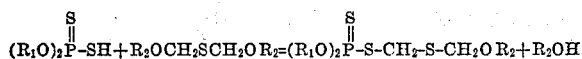

The condensation can be carried out at temperatures within the range of 20 to 150° C.

The so-obtained compounds are, at ordinary temperature (e.g. about 20° to about 30° C.) generally colorless viscous liquids which, in many cases, can be distilled under reduced pressure without decomposition. They are stable in aqueous emulsion and are soluble in oils as well as in organic solvents.

The crude products, as well as those purified by distillation, possess good insecticidal properties and are therefore especially useful for the preparation of pest combating agents. Thanks to their good systemic action, they are useful in the preparation of seed disinfectants, especially of seed disinfectants for the treatment of cottonseed. To this end, an active compound according to the present invention—for example, a compound prepared according to any one of the examples hereinafter set forth—is admixed with an emulsifying agent, such as an alkylpolyglycolether or an alkylphenylpolyglycolether or a sulfonated oil and, if desired, also with an appropriate organic solvent, such e.g. as an alcohol, mineral oil, ketone or aromatic hydrocarbon. For seed disinfectant purposes, pulverulent preparations are advantageous which consist of mixtures of the aforesaid active compounds and active carbon, kieselguhr or the like absorbent inorganic materials, and which may also contain gum or methylcellulose as a "sticker."

The following examples set forth representative preferred embodiments of the invention. In these examples, the parts and percentages are by weight, and the temperatures are in degrees centigrade.

Example 1

37 parts of the compound of the formula

which boils at 50–52° under a pressure of 12 mm. Hg and which is prepared from $Na_2S$ and $CH_3OCH_2Cl$, are admixed with 48 parts of dimethyldithiophosphoric acid, and the mixture stirred and heated to 100–110° for 3 hours. The reaction mixture is then taken up in chloroform and shaken out with dilute aqueous sodium carbonate solution. After drying the resultant chloroform solution and distilling off the chloroform, a residue is obtained which, upon distillation, yields the compound of the formula

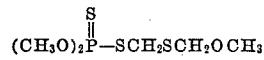

which boils at 100–102° under a pressure of 0.06 mm. Hg.
*Analysis.*—S (calculated)=38.7%; (found)=39.2%.

Example 2

By proceeding after the manner described in Example 1, but using

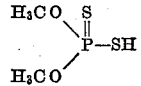

as compound I and $$C_2H_5OCH_2SCH_2OC_2H_5$$

as compound II, there is obtained the compound of the formula

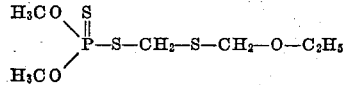

which boils at 111–115° under a pressure of 0.2 mm. Hg.
*Analysis.*—S (calculated)=36.6%; (found)=37%.

Example 3

By proceeding after the manner described in Example 1, but using

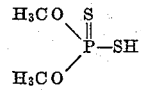

as compound I and $$iso\text{-}C_3H_7OCH_2SCH_2OC_3H_7\text{-}iso$$

as compound II, there is obtained the compound of the formula

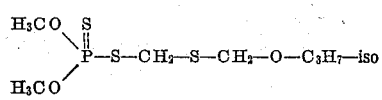

which is not distillable.

Example 4

By proceeding after the manner described in Example 1, but using

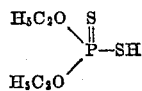

as compound I and $$CH_3OCH_2SCH_2OCH_3$$

as compound II, there is obtained the compound of the formula

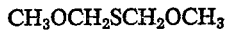

which boils at 104–107° under a pressure of 0.07 mm. Hg.

*Analysis.*—P (calculated)=11.2%; P (found)=10.7%.

Example 5

By proceeding after the manner described in Example 1, but using

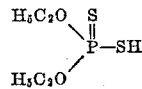

as compound I and $$C_2H_5OCH_2SCH_2OC_2H_5$$

as compound II, there is obtained the compound of the formula

which boils at 113° under a pressure of 0.06 mm. Hg.

*Analysis.*—P (calculated)=10.7%; (found)=10.5%.

Example 6

By proceeding after the manner described in Example 1, but using

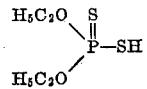

as compound I and $$i\text{-}C_3H_7OCH_2SCH_2OC_3H_7\text{-}i$$

as compound II, there is obtained the compound of the formula

which boils at 114–117° under a pressure of 0.06 mm. Hg.

*Analysis.*—S (calculated)=31.5%; (found)=31.0%.

Example 7

By proceeding after the manner described in Example 1, but using

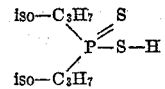

as compound I and $$C_2H_5OCH_2SCH_2OC_2H_5$$

as compound II, there is obtained the compound of the formula

which boils at 114–117° under a pressure of 0.08 mm. Hg.

*Analysis.*—S (calculated)=30.1%; (found)=29.9%.

Example 8

By proceeding after the manner described in Example 1, but using

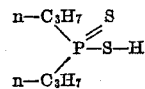

as compound I and $$C_2H_5OCH_2SCH_2OC_2H_5$$

as compound II, there is obtained the compound of the formula

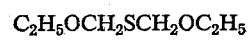

which boils at 113–114° under a pressure of 0.05 mm. Hg.

Example 9

50 parts by weight of the ester described in Example 1 are mixed with 50 parts of iso-octylphenyl-heptaglycolether to give a clear solution. An aqueous emulsion of this material, containing 0.05% of the ester is sprayed upon young apple trees infested with aphids. After a few hours the aphids are destroyed.

Example 10

50 parts by weight of the ester described in Example 2 are mixed with 40 parts by weight of laurylhexaglycolether and 10 parts by weight of xylene. A 0.1% aqueous emulsion of this material is sprayed upon potted plants (cinneraria, asters, chrysanthemums) infested with aphids. The aphids are completely destroyed after a few hours.

Example 11

A powdered material which may readily be suspended in water is obtained by intimately mixing 15 parts by weight of the ester described in Example 4 with 3 parts by weight of tert.dodecyl-mercaptane undecaglycyl ether, 7 parts by weight of powdered silica gel and 75 parts by weight of kaolin. A 0.1% aqueous dispersion of this powdered mixture when sprayed upon aphids destroys the same completely in a few hours.

Example 12

2 parts by weight of the ester described in Example 5 are mixed with 98 parts by weight of talc, and the mixture is ground in a ball mill. There is obtained a dusting agent which is sprayed as a thin layer on Petri dishes. Periplaneta introduced into these dishes are dead within 24 hours.

Example 13

50 parts by weight of the ester described in Example 2 are thoroughly mixed with 50 parts by weight of active carbon. 6 parts by weight of this powdered preparation are mixed with 94 parts by weight of cotton seed. Cotton plants from seed treated as described are resistant to the attack by sucking insects.

The compounds corresponding to the Formula II are prepared in an analogous manner as described in Example 1. They have the following boiling points:

$C_2H_5OCH_2SCH_2OC_2H_5$ _____ 67–70°/12 mm.
iso-$C_3H_7OCH_2SCH_2OC_3H_7$-iso _____ 81–84°/12 mm.

Having thus disclosed the invention, what is claimed is:

A process for producing new dithiophosphoric acid esters of the formula

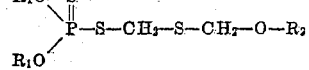

wherein each of $R_1$ and $R_2$ is a lower alkyl group, comprising the reaction between the compounds of the formula
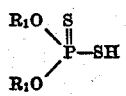   (I)
and of the formula
$R_2—O—CH_2—S—CH_2—O—R_2$   (II)
in which formulae the radicals $R_1$ and $R_2$ have the same meaning as above.
References Cited in the file of this patent
UNITED STATES PATENTS
2,571,989   Schrader _____ Oct. 16, 1951
OTHER REFERENCES
Mastryukova et al.: "Izvest. Akad. Nauk S.S.S.R., Otdel Khim. Nauk" (1956), pp. 443–450. See also Chem. Abst., vol. 50, col. 16,662, Nov. 25, 1956.